United States Patent [19]
Orlicki et al.

[11] Patent Number: 5,546,513
[45] Date of Patent: Aug. 13, 1996

[54] DATA TRANSMISSION SYSTEM FOR SPARSE ARRAY PRINT HEAD

[75] Inventors: David Orlicki; James Larrabee, both of Rochester; Karen L. Herczeg, Webster, all of N.Y.

[73] Assignee: Eastman Kodak Company, Rochester, N.Y.

[21] Appl. No.: 123,833

[22] Filed: Sep. 20, 1993

[51] Int. Cl.[6] .................................................. G06K 15/00
[52] U.S. Cl. ................................. 395/111; 395/101
[58] Field of Search ............................ 395/111, 108, 395/114, 109, 101, 110, 112

[56] References Cited

U.S. PATENT DOCUMENTS

| | | | |
|---|---|---|---|
| 4,996,650 | 2/1991 | Kenbo | 364/519 |
| 5,121,343 | 6/1992 | Faris | 395/111 |
| 5,129,050 | 7/1992 | Ikenove et al. | 395/115 |
| 5,140,673 | 8/1992 | Murano | 395/108 |
| 5,140,674 | 8/1992 | Anderson et al. | 395/111 |
| 5,161,246 | 11/1992 | Stapleton | 395/111 |
| 5,167,459 | 12/1992 | Yano et al. | 395/108 |
| 5,191,640 | 3/1993 | Plass | 395/112 |
| 5,207,517 | 5/1993 | Ito | 395/110 |
| 5,270,728 | 12/1993 | Lund et al. | 395/108 |
| 5,299,292 | 3/1994 | Kadiwaki et al. | 395/108 |
| 5,303,335 | 8/1991 | Iwasaki et al. | 395/111 |
| 5,353,387 | 10/1994 | Petschik et al. | 395/109 |

Primary Examiner—Raymond J. Bayerl
Assistant Examiner—Steven P. Sax
Attorney, Agent, or Firm—Milton S. Sales

[57] ABSTRACT

An image data transmission system minimizes image data source access cycles and serial transmission channel bandwidth requirements when supplying image data to a sparse LED array in a rotary printer. A subpixel data accessing unit is employed within the transmission system to compensate for the physical offset of red, green and blue diode sets in a page scan direction. A column correction unit is employed to accommodate redundant exposure of an image location by the diodes in a line scan direction. The subpixel data accessing unit preferably includes a set of First-In, First-Out (FIFO) memories, which receive input lines of image data with pixels organized as sets of three bytes corresponding the red, green and blue (RGB) information of unique physical locations of an image and output lines of image data with R, G and B components from pixels in offset input lines. The column correction unit preferably includes a tapped parallel shift register memory.

20 Claims, 4 Drawing Sheets

5,546,513

DATA TRANSMISSION SYSTEM FOR SPARSE ARRAY PRINT HEAD

FIELD OF THE INVENTION

The invention relates in general to systems for printing digitized images. The invention relates specifically to printing systems that utilize a rotating print drum equipped with a print head to scan a photosensitive media.

BACKGROUND OF THE INVENTION

Copending and commonly assigned U.S. patent application Ser. No. 08/075,433, filed on Jun. 14, 1993, entitled "Integrated Rotary Printer Drive System" by Orilick et al., the contents of which are herein incorporated by reference, describes a rotary printer drive system having a print head that includes a light-emitting-diode (LED) array. The LED array, located within a rotating print drum, is focused with an optical system onto a photographic media fixed to a concentrically mounted cylindrical shoe. The LEDs are modulated so as to raster scan image information onto the media as the drum rotates and is axially translated through the shoe. Data is transmitted to the LED array via a rotary transformer channel at a rate dictated by the measured rotational rate of the print drum.

As described in copending and commonly assigned U.S. patent application entitled "Method and Apparatus for Exposing Photosensitive Media with Multiple Light Sources", by D. H. Smith et al., Attorney Docket No. 66,013, the contents of which are herein incorporated by reference, the LED array is preferably formed as an integrated structure having a two dimensional array of LED's arranged in columns and rows, wherein the columns and rows are arranged at a spatial frequency less than the spatial frequency of image lines and image pixels to be produced. The geometry of this "sparse" LED array is such that multiple physical pixel locations on the media are simultaneously exposed by individual LED elements of the print head at any time. As the print head scans along a line, adjacent pixels are uniquely exposed and each pixel is redundantly exposed with its unique information in non-contiguous pixel time intervals.

The most direct method of driving the LEDs of the sparse array is to access an image data source and transmit data pertaining to each of the multiple pixels being exposed in the current pixel clock interval for each such interval. This method, however, would require the printing system to have very high transmission bandwidth and data access capacities, in order to avoid limiting image throughput rate and machine productivity.

In view of the above, it is an object of the invention to provide an improved data transmission system for supplying image data to the sparse array.

SUMMARY OF THE INVENTION

The invention provides an image data transmission system particularly well suited to the geometry of the sparse LED array print head. The image data transmission system minimizes image data source access cycles and serial transmission channel bandwidth requirements. Specifically, a subpixel data accessing unit is employed within the transmission system to compensate for the physical offset of red, green and blue diode sets in a page scan direction. A column correction unit is employed to accommodate redundant exposure of an image location by the diodes in a line scan direction.

The subpixel data accessing unit preferably includes a set of First-In, First-Out (FIFO) memories, which receive input lines of image data with pixels organized as sets of three bytes corresponding the red, green and blue (RGB) information of unique physical locations of an image and output lines of image data with pixels organized as sets of three bytes, but with R, G and B components from pixels in offset input lines. The component offsets are chosen to compensate for the physical offsets of the red, green and blue diode sets in the print head.

The column correction unit preferably includes a tapped parallel shift register memory, which provides high speed, repetitive access to pixel data corresponding to only those pixel locations currently within the field of view of the print head. New pixel data is shifted into the shift register memory once for each pixel advance of the print head while data pertinent to the pixel exiting the field of view of the print head is overwritten. Redundant exposure of each pixel location can be achieved with data locally available from the shift register memory rather than by redundant retrieval of data from the image source.

BRIEF DESCRIPTION OF THE DRAWINGS

The invention will be described in detail with reference to the drawings, wherein.

DETAILED DESCRIPTION

Figure 1:
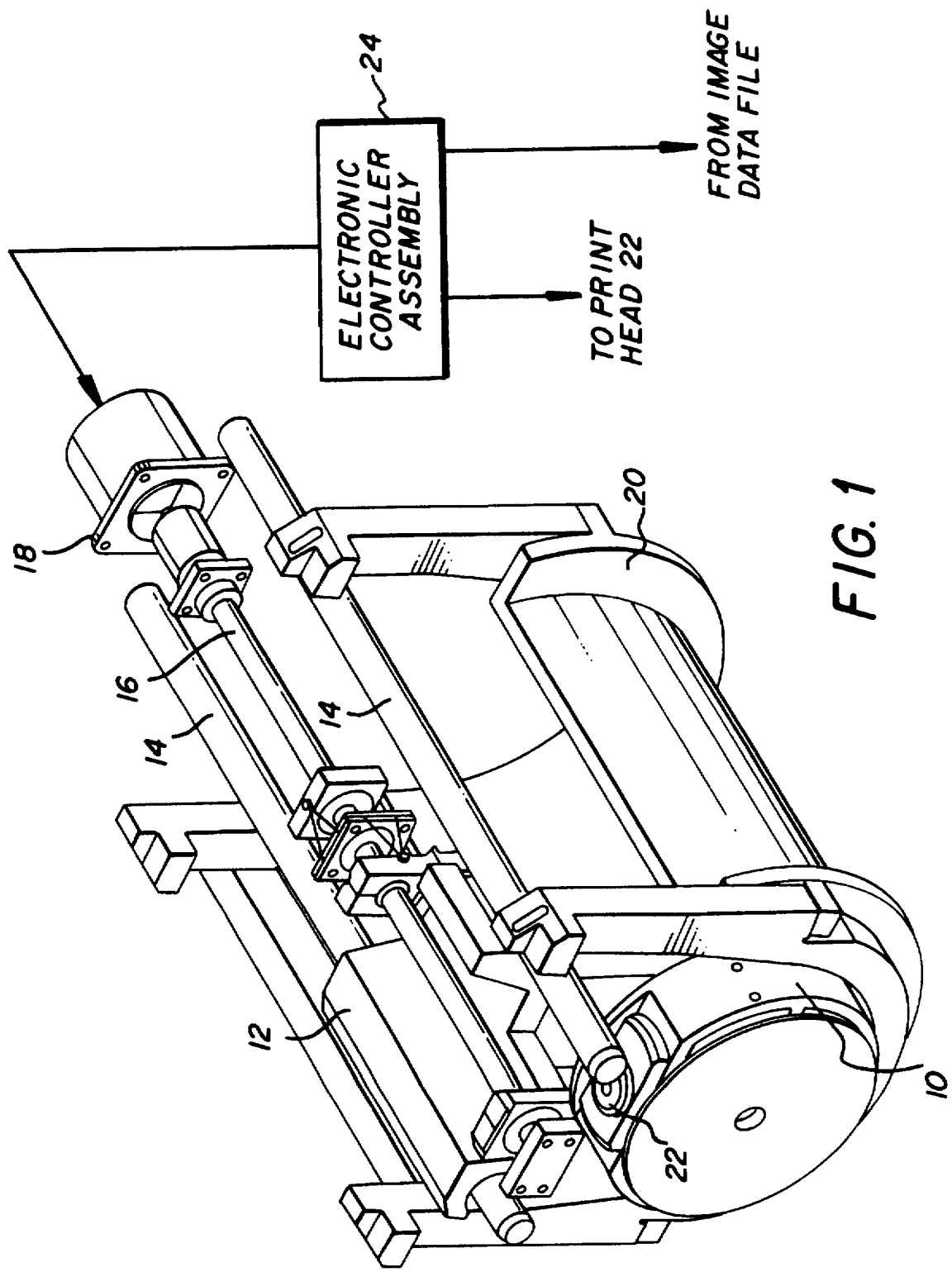
FIG. 1 is a diagram of a rotary printer in accordance with the invention.
Figure 2:
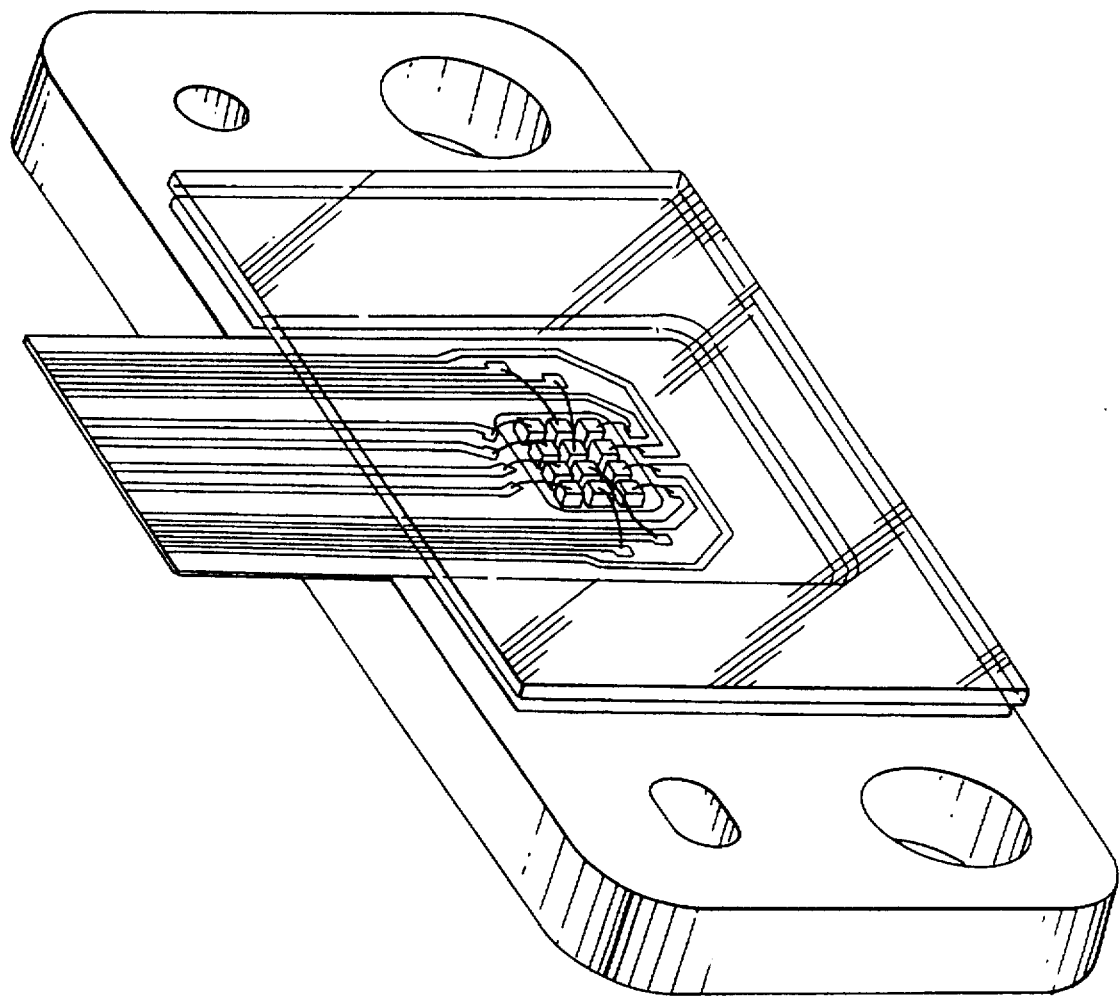
FIG. 2 illustrates a sparse LED array incorporated in the print head of the rotary printer illustrated in FIG. 1.

FIG. 1 illustrates a rotary printer system that includes a print drum 10 mounted to a carriage 12. The carriage 12 is driven along guide rails 14 by a drive mechanism including a lead screw 16 rotated by a motor 18. The movement of the carriage 12 causes the rotary print drum 10 to axially translate through a cylindrical housing or shoe 20 that holds a photosensitive media. The print drum 10 includes a drive mechanism, either mounted on the carriage 12 or formed integral with the print drum 10, which causes the print drum 10 to rotate as is it moves through the cylindrical shoe 20. A print head 22, including an integrated sparse LED array (shown in greater detail in FIG. 2) that exposes the photosensitive media as the print drum 10 is rotated and translated through the cylindrical shoe 20, is mounted to the exterior surface of the print drum 10. An electronic controller assembly 24 is used to supply power, control and data signals to the motor 18 and the print head 22.

Figure 3:
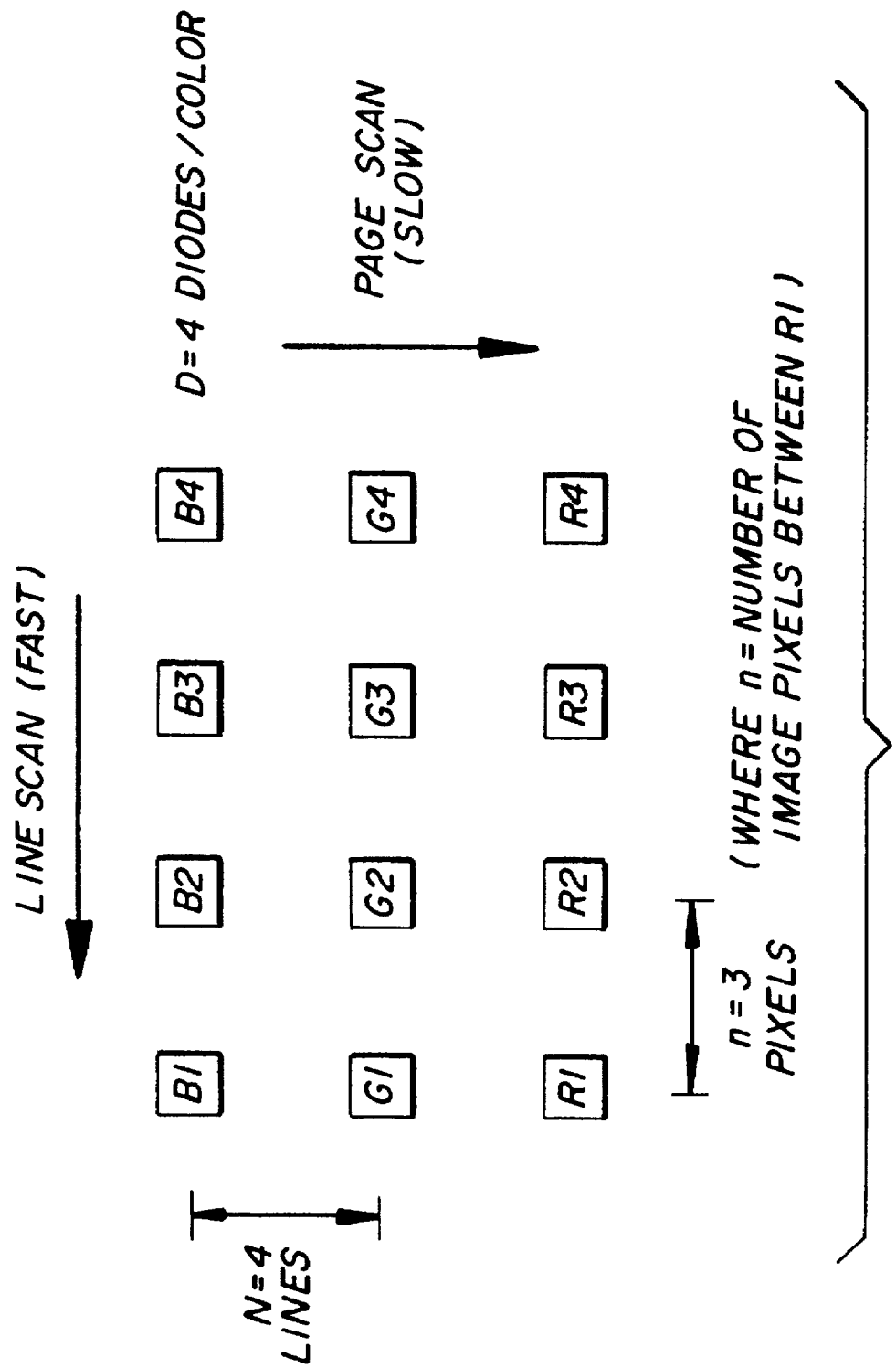
FIG. 3 is a schematic diagram illustrating the individual elements of the sparse LED array shown in FIG. 2.

The sparse LED array, schematically depicted in FIG. 3, partially exposes twelve separate physical image pixel locations during operation, which requires that the data from an image data file corresponding to the twelve pixels be supplied to the array. Considering the exposure of a particular pixel, the LEDs are arranged in rows by color with the motion of the print head 22, such that the photosensitive media is exposed D times in rapid succession by R1, R2, R3 and R4 (D=4 in FIG. 1) at intervals corresponding to the exposure time of n pixels (n=3 in FIG. 1, but may be any integral pixel pitch in general). The output of each of the LEDs provides partial exposure of a physical pixel location corresponding to a distinct data point in the image data file, with the data point preferably being represented by three bytes (R, G, B) of information. The same pixel location is exposed N line times later by G1, G2, G3 and G4 on n pixel intervals and again, another N line times later, by B1, B2, B3 and B4 on n pixel intervals. The pixel is thus initiated with the first exposure by R1 and terminated 2N lines and nD pixels later by the B4 exposure. Data for a given pixel is therefore used 3D (12 times in the illustrated example) during a complete exposure interval.

The redundant use of pixel data to complete an exposure interval limits print speed by two mechanisms, namely, data access time and data transmission speed. Image data is generally stored in high capacity disk or tape files which have multiple millisecond access times but very high data transfer rates. Prior to printing, the data is transferred to a solid state memory with sub-microsecond access time. Even with solid state memory, however, the requirement for 3D access times per pixel can easily restrict print speed. Data is preferably transferred to the rotating print head of the printer in a serial stream. Multiple transmissions must therefore be utilized in order to provide the required redundant data. Multiple transmissions of pixel data, however, are wasteful of finite data transmission bandwidth of the printer.

The invention is based, in part, on the recognition that two key factors serve as the basis for reducing both memory access cycles and serial transmission bandwidth. The first factor is that a single pixel interval, ND pixels are partially exposed as the print drum 10 rotates, but only one is begun (with R1) and only one is completed (with B4). That is, new data is required for only one new pixel per pixel interval and one pixel's worth of data may be discarded. The second factor is that one pixel is initiated in red (R1), another in green (G1) and still another in blue (B1), as the print drum 10 advances a single pixel interval.

Based on these factors, a strategy for minimizing data access and transmission requirements has been developed. In each pixel interval, one pixel's worth of information, i.e., one byte each of R, G and B data, corresponding to the pixels entering the field of view of the optical system of the print head 22 is supplied to the LED array. This strategy necessitates two elements of system architecture. First, since three distinct physical pixel locations are written to in a given pixel interval, a means for sequentially accessing subpixel level information from non-adjacent pixels is required. Second, a byte of subpixel level information (i.e., an individual R, G or B pixel component) will be transmitted only once but will be used D times, therefore a means for storing the subpixel level information is required.

Figure 4:
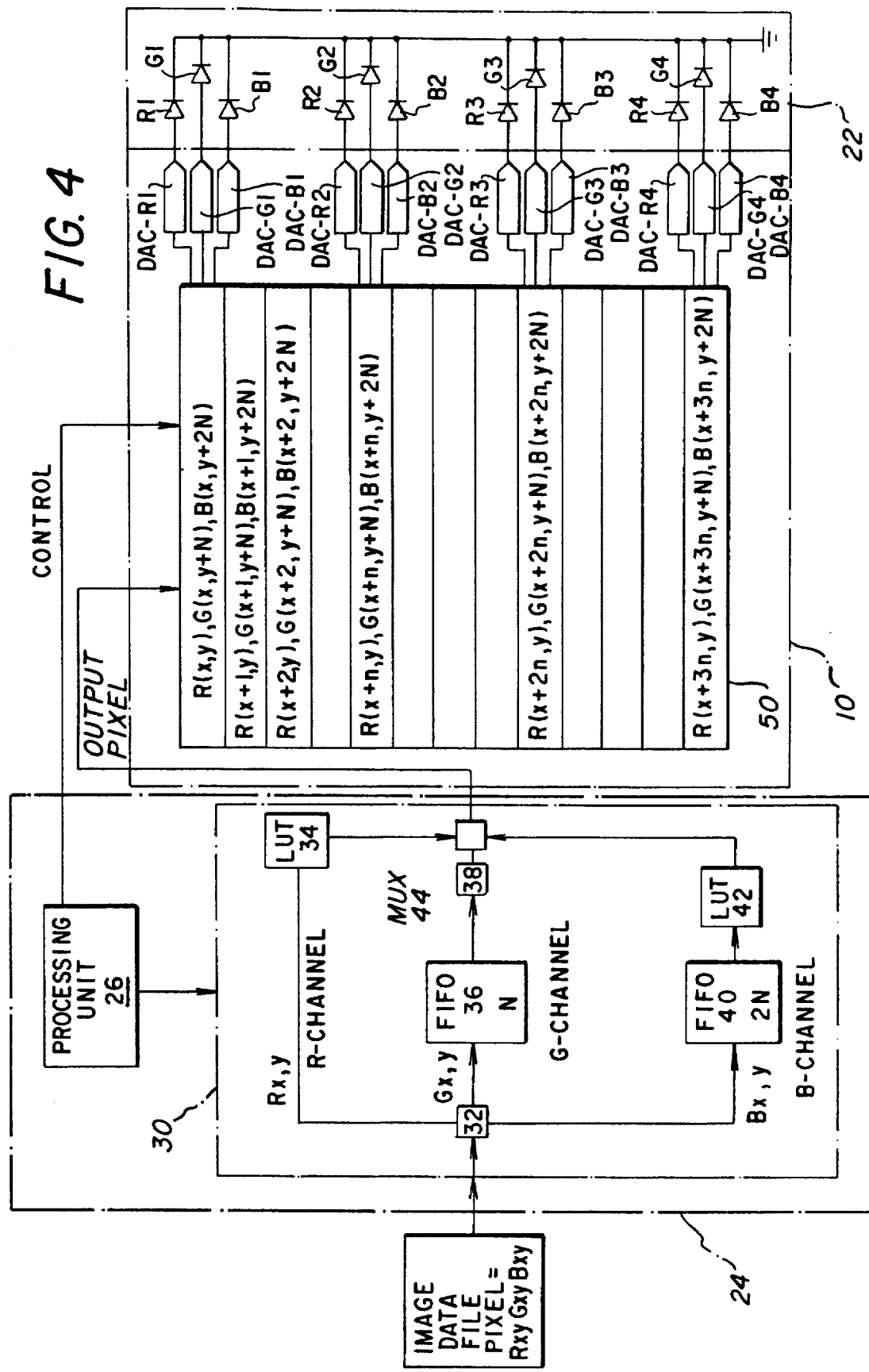
FIG. 4 is a block diagram of a data transmission system for driving the individual elements illustrated in FIG. 3.

FIG. 4 illustrates the data transmission system employed in the print head 22 in accordance with the invention. Image data, fetched from an image data file as sets of RGB bytes corresponding to unique pixels, is separated into individual color components and reassembled as sets of RGB bytes with contributions from three distinct pixels from offset lines in the original data. The newly assembled pixel contains the RGB information corresponding to those physical pixel locations entering the field of view of the print head optics.

Specifically, the data words for individual pixels, each preferably including three eight-bit byte subpixel color components R(x,y), B(x,y), G(x,y), are serially transmitted, line by line, to a serial input data line of a subpixel data accessing unit 30, preferrably located within the electronic controller assembly 24. The subpixel data accessing unit 30 includes a switching or demultiplexer unit 32 that separates and supplies the subpixel components to corresponding R, G, B channels. The R channel includes a data compensation look-up-table (LUT) 34 coupled between the demultiplexer unit 32 and the output of the subpixel data accessing unit 30. The G channel includes a FIFO 36 having an input coupled to the output of the demultiplexer 32 and an output coupled to a data compensation LUT 38. The B channel includes a FIFO 40 having an input coupled to the output of the demultiplexer 32 and an output coupled to a data compensation LUT 42. The outputs from the compensation LUTs 34, 38, 42 are supplied to a multiplexer 44 which recombines color components before serial transmission from the subpixel data accessing unit 30. The overall function of the subpixel data accessing unit 30 is controlled by a processing unit 26 also located within the electronic controller assembly 24.

The compensation LUTs 34, 38, 42 are used to compensate for the highly nonlinear relationship between photographic exposure and image density, which requires that the image data stored in the image file must be appropriately filtered or "warped" before being used to drive LED currents. A data byte corresponding to a color component is supplied as the address of the LUT. Stored at the address location is a data byte corresponding to the drive current required to produce the desired density subject to the performance of current drivers, LEDs and the photographic media. The use of compensation LUTs is well known in the art. They are utilized in the subpixel data accessing unit 30 to condition the image data prior to serial transmission.

In operation, R data is immediately passed through the subpixel data accessing unit 30, while G data is stored in the G channel FIFO 32 to provide an N line delay and B data is stored in the B channel FIFO 34 to provide a 2N line delay. Thus, the data output from the subpixel data accessing unit 30 consists of the compensated R data for a given pixel location (x,y), the compensated G data for a given pixel location (x,y+N) in the next line N, and the compensated B data for a given pixel location (x,y+2N) 2N lines later. The subpixel data accessing unit 30 therefore permits transmission of non-contiguously stored data corresponding to three physically separate pixel locations during a given pixel interval, while limiting data access to contiguously stored bytes corresponding to a single pixel, by utilizing 3LN bytes of FIFO memory capacity (for example 47 Kbytes for a system with 4K line length and 4 pixel line offset).

The data output from the subpixel data accessing unit 30 is serially transmitted to a column correction unit 50, which is preferably located on the print drum 10. The column correction unit 50 organizes the data into the correct columns for writing to the LED array. Four such columns are required in the preferred embodiment: R1G1B1, R2G2B2, R3G3B3 and R4G4B4. Rather than configure and transmit these four pixels each pixel interval, a tapped parallel shift register is employed as the column correction unit 50 to take advantage of the fact that the data printed in the first column will be reused in the second, third and fourth columns at n pixel intervals.

At the beginning of a pixel interval, data in all the registers is parallel shifted downstream to make room in the first register for new data. Serial Data is then received from the subpixel data accessing unit 30 and stored in the first register. Data in the registers on n pixel intervals, corresponding to the column spacing of diodes in the head, is shifted out in parallel to digital-to-analog converters (DAC), which convert the digital data to an analog signal that is used to drive the LEDs of the array. Specifically, the output lines of the shift registers are grouped such that the R,G,B data bytes are respectively provided to the inputs of corresponding R,G,B DACs. The column correction unit is preferably implemented using an ACTEL 1280 programmable gate array.

The use of a tapped shift register (or tapped analog delay line) memory, so as to simultaneously reduce memory access cycles and decrease data transmission bandwidth requirements, is particular to the geometry of the sparse array LED print head. N line displacement of color planes in FIFO memory compensate the N line displacement of color rows of LEDs and n pixel shift register taps compensate n pixel column spacing of LEDs in the head.

The advantages derived from the invention include: the maintenance of the printer pixel rate asynchronous to the operation of the host image source; the reduction of the number of host image source accesses per pixel from three to one due to the color plane offset provided through the use of the FIFOs; the reduction of the number of host memory accesses per pixel from D to one, where D is the number of LEDs per color in the print head, through the use of the tapped shift register memory; and the reduction of the serial communication bandwidth requirement from PDk bits per second to Pk bits per second, where k is the number of bits used to represent one RGB pixel and P is the number of pixels per second transmitted (note that Pk bits per second is the theoretical minimum frequency required for printing, independent of head geometry), by the placement of the tapped shift register memory on the print drum.

The invention has been described with reference to certain preferred embodiments thereof. It will be understood, however, that modifications and variations are possible within the scope of the appended claims.

Industry Utility

The invention is utilized in a rotary printer incorporating a sparse LED array to reduce transmission bandwidth requirements and minimize access cycles. It will be understood, however, that the invention is not limited to the specifically disclosed rotary printer application, but can be employed in other systems to perform the same functions.

What is claimed:

1. A data transmission system comprising:
   a subpixel data accessing means for receiving input lines of image data comprising a plurality of input pixel data words, wherein each input pixel data word includes a set of contiguous data bytes corresponding to color subpixel components of the input pixel data word, and for serially transmitting output lines of image data comprising a plurality of output pixel data words, wherein each output pixel data word includes a set of non-contiguous data bytes corresponding to subpixel color components from different input pixel data words from offset input lines; and
   column correction means for receiving the serially transmitted output lines of image data and transmitting the output pixel data words of the serially transmitted output lines in parallel as column corrected output data lines, wherein the column correction means transmits a column corrected output data line for each received output pixel data word and each output pixel data word is included in a plurality of column correct output data lines.

2. A data transmission system claimed in claim 1, further comprising conversion means, coupled to the output of the column correction means, for converting the column corrected output data lines to analog drive signals.

3. A data transmission system as claimed in claim 2, further comprising an LED array coupled to the output of the conversion means to receive the analog drive signals.

4. A data transmission system as claimed in claim 1, wherein the subpixel data accessing means comprises means for separating the input pixel data words into their subpixel components and supplying the subpixel components to corresponding data channels, and means for assembling subpixel components from each of the data channels to form the output pixel data words.

5. A data transmission system as claimed in claim 4, wherein at least one data channel includes a FIFO memory for storing subpixel components for N lines of input image data.

6. A data transmission system as claimed in claim 5, wherein a second data channel includes a FIFO memory for storing subpixel components for 2N lines of image data.

7. A data transmission system as claimed in claim 5, wherein each data channel includes a compensation LUT.

8. A data transmission system as claimed in 1, wherein the column correction means comprises a parallel shift register.

9. A data transmission system comprising:
   means for serially receiving input pixel data words, wherein each input pixel data word comprises a red, green and blue subpixel component, and separating the input pixel data words into their respective subpixel components;
   means for arranging the subpixel components from input pixel data words to form output pixel data words, wherein each output pixel data word includes subpixel components from at least three different input pixel data words, and for serially transmitting the output pixel data words; and
   column conversion means for receiving and converting the serially transmitted output pixel data words to parallel column output data lines, wherein the column conversion means generates at least one parallel column output data line for each received serially transmitted output data word.

10. A data transmission system as claimed in claim 9, further comprising digital-to-analog conversion means for generating analog drive signals from the parallel column output data lines received from the column conversion means.

11. A data transmission system as claimed in claim 10, further comprising a plurality of LEDs coupled to the output of the digital-to-analog conversion means to receive the analog drive signals.

12. A data transmission system comprising:
   a subpixel data accessing unit including a demultiplexing unit coupled to a serial data input line, a multiplexing unit coupled to a serial output data line, first, second and third data channels coupled between the demultiplexing unit and the multiplexing unit, wherein the second data channel includes an N line delay memory and the third data channel includes a 2N line delay memory; and
   a column correction unit comprising a tapped shift register having an input coupled to the serial output data line of the subpixel data accessing unit, and a plurality of registers, each register including a plurality of parallel output data lines;
   wherein said subpixel data accessing unit receives input lines of image data comprising a plurality of input pixel data words, each input pixel data word including a set of data bytes corresponding to subpixel components, and generates a plurality of output pixel data words, each output pixel data word including a set of data bytes corresponding to subpixel components from different input pixel data words.

13. A data transmission system as claimed in claim 12, further comprising a digital-to-analog converter coupled to each of the parallel output data lines.

14. A data transmission system as claimed in claim 13, further comprising a light emitting element coupled to an output of each digital-to-analog converter.

15. A rotary printer comprising:

a cylindrical shoe for retaining a photosensitive media; a rotatable print drum coupled to a movable carriage, the rotatable print drum including a print head having an array of light emitting elements; means for moving the carriage to axially traverse the rotatable print drum through the cylindrical shoe; and a data transmission system for transmitting image data from an image file to the print head;

wherein the data transmission system comprises a subpixel data accessing means for receiving input lines of image data comprising a plurality of input pixel data words, wherein each input pixel data word includes a set of contiguous data bytes corresponding to subpixel color components of the input pixel data word, and for serially transmitting output lines of image data comprising a plurality of output pixel data words, wherein each output pixel data word includes a set of non-continuous data bytes corresponding to subpixel color components from different input pixel data words from offset input lines; and a column correction means for receiving the serially transmitted output lines of image data and transmitting the output pixel data words of the serially transmitted output lines in parallel as column corrected output data lines, wherein the column correction means transmits a column corrected output data line for each received output pixel data word and each output pixel data word is included in a plurality of column correct output data lines.

16. A rotary printer as claimed in claim 15, wherein the column correction means is located on the rotatable print drum.

17. A rotary printer as claimed in claim 15, wherein the data transmission system further comprises conversion means, coupled to the output of the column correction means, for converting the column corrected output data lines to analog drive signals that are supplied to the light emitting elements of the print head.

18. A rotary printer as claimed in claim 15, wherein the subpixel data accessing means comprises means for separating the input pixel data words into their subpixel components and supplying the subpixel components to corresponding data channels, and means for assembling subpixel components from each of the data channels to form the output pixel data words.

19. A rotary printer as claimed in claim 18, wherein at least one data channel includes a FIFO memory for storing subpixel components for N lines of input image data.

20. A rotary printer as claimed in claim 19, wherein a second data channel includes a FIFO memory for storing subpixel components for 2N lines of image data.

* * * * *

UNITED STATES PATENT AND TRADEMARK OFFICE
CERTIFICATE OF CORRECTION

PATENT NO. : 5,546,513
DATED : August 13, 1996
INVENTOR(S) : David Orlicki, et al It is certified that error appears in the above-indentified patent and that said Letters Patent is hereby corrected as shown below:

Column 7, line 30 and 31   delete "non-continuous" and insert --non-contiguous--

Signed and Sealed this

Thirty-first Day of December, 1996

Attest:

BRUCE LEHMAN

Attesting Officer      Commissioner of Patents and Trademarks